United States Patent [19]

Hassan

[11] 4,059,041
[45] Nov. 22, 1977

[54] SNAP-ON SCREW

[75] Inventor: Edward Hassan, Montreal, Canada

[73] Assignee: The Raymond Lee Organization, Inc., New York, N.Y.; a part interest

[21] Appl. No.: 675,856

[22] Filed: Apr. 12, 1976

[51] Int. Cl.² ............................................. F16B 21/08
[52] U.S. Cl. .................................... 85/3 S; 24/230 AS
[58] Field of Search ................. 85/35, 3 R, 3 K, 66; 24/230 AS, 213 R, 214, 211 P; 292/15; 403/61

[56] References Cited

U.S. PATENT DOCUMENTS

| 79,801 | 7/1868 | Adams | 85/35 X |
|---|---|---|---|
| 233,281 | 10/1880 | Reinhold et al. | 85/35 |
| 531,791 | 1/1895 | Fischer | 85/35 |
| 577,285 | 2/1897 | Caugherty | 85/35 |
| 744,985 | 11/1903 | Stuart | 85/35 |
| 892,333 | 6/1908 | Traub | 85/35 |
| 1,089,891 | 3/1914 | Wooley | 24/214 |
| 1,169,693 | 1/1916 | Swedlund | 85/84 X |
| 1,538,320 | 5/1925 | Gullong | 85/35 |
| 1,584,851 | 5/1926 | Crone | 85/35 |
| 1,830,817 | 11/1931 | Voorhies et al. | 85/3 R X |
| 3,219,374 | 11/1965 | Snell | 292/15 |
| 3,403,594 | 10/1968 | Newell | 85/3 R X |
| 3,669,481 | 6/1972 | Bergmann | 85/35 X |

FOREIGN PATENT DOCUMENTS 1,209,768 10/1970 United Kingdom ............ 24/230 AS Primary Examiner—Roy D. Frazier
Assistant Examiner—Thomas J. Holko
Attorney, Agent, or Firm—Howard I. Podell

[57] ABSTRACT

A pair of threaded fasteners which are attachable to each other by means of a plug and socket joint so that each of the pair may be individually threaded into separate members which are then joined together. The plug of the male fastener of the pair is of a cylindrical shape with leaves hinged in recesses in the plug wall, with the female fastener fitted with a cylindrical socket to fit the plug, with recesses in the socket wall to retain the leaves of the male plug. The leaves of the male plug may be spring-biased.

1 Claim, 4 Drawing Figures

U.S. Patent     Nov. 22, 1977     4,059,041
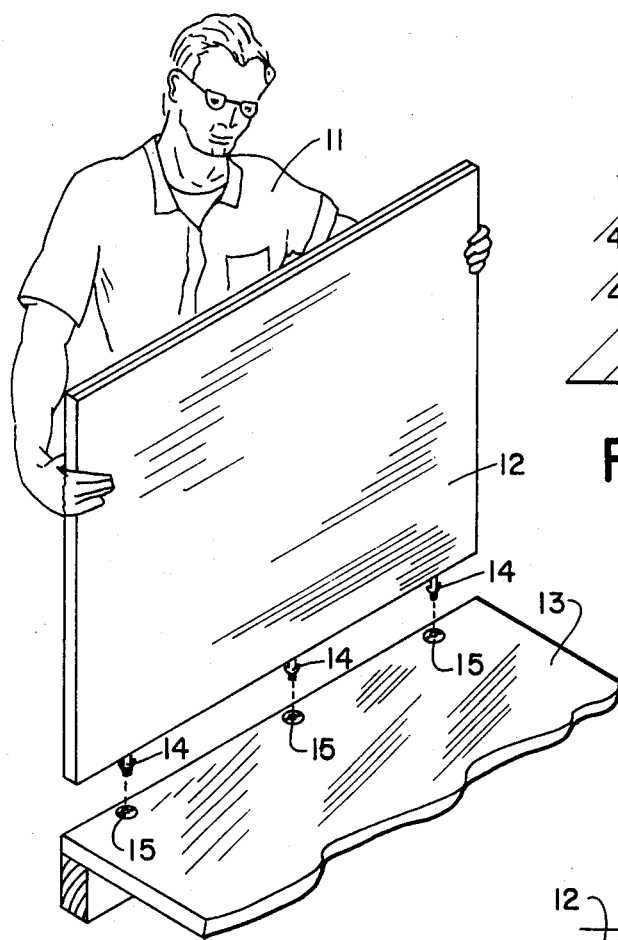
FIG. 1
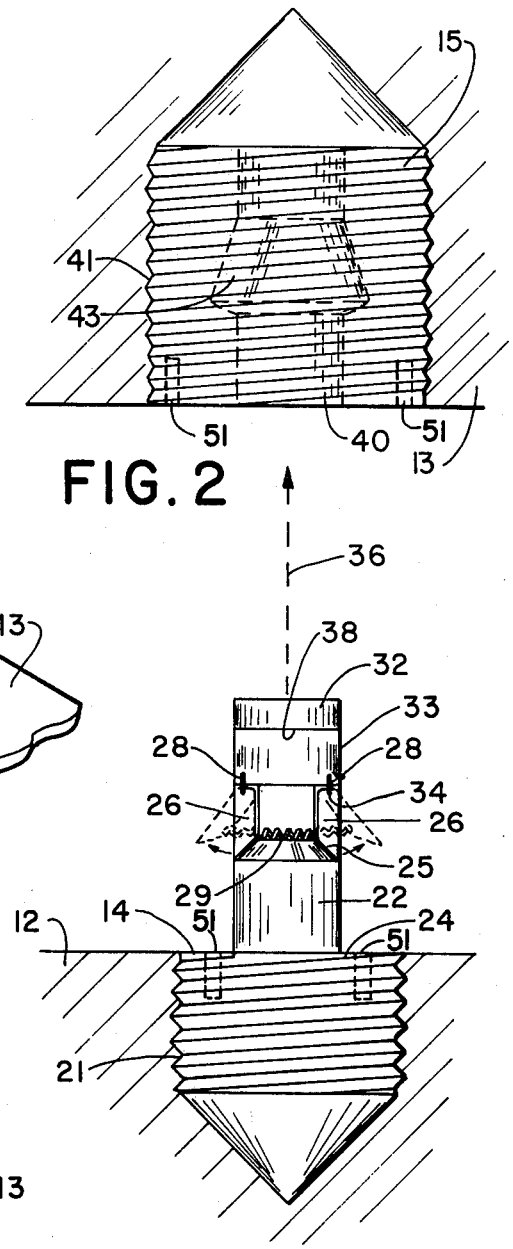
FIG. 2
FIG. 3
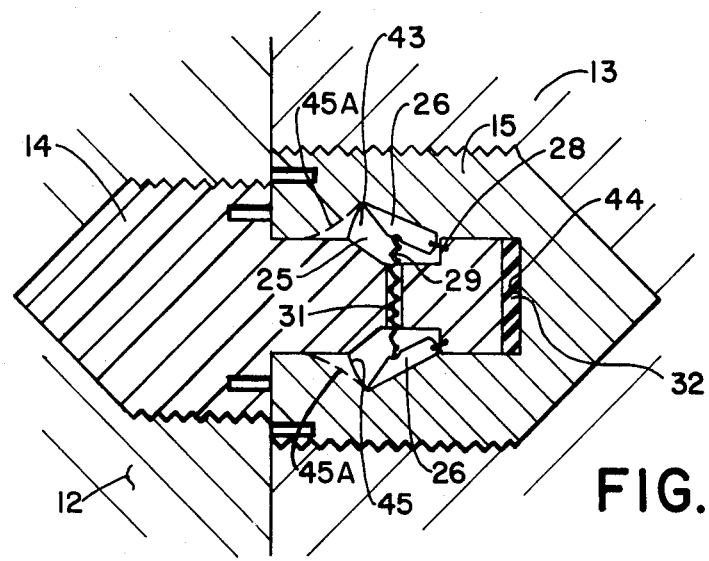
FIG. 4

SNAP-ON SCREW

SUMMARY OF THE INVENTION

My invention is a pair of male threaded fasteners which are attachable to each other by means of a plug and socket joint so that each of the pair may be individually threaded into separate members which are then joined together. The plug of the male fastener of the pair is of a cylindrical shape with leaves hinged in recesses in the plug wall, with the female fastener fitted with a cylindrical socket to fit the plug with recesses in the socket wall to retain the leaves of the male plug. The leaves of the male plug may be spring-biased.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use;

FIG. 2 is an elevation view of the male member;

FIG. 3 is an elevation view of the female member; and

FIG. 4 is a sectional view of the joined male and female members of the invention.

DESCRIPTION OF THE PREFERRED EMBODIMENT

Turning now descriptively to the drawings, in which similar reference characters denote similar elements throughout the several views, FIG. 1 illustrates a user 11 joining a first panel 12 to a second panel 13, by means of three male fasteners 14 threaded into the first panel 12 which are to mate with three female fasteners 15 threaded into the second panel 13.

Male fastener 14, as shown in FIGS. 3–4, is formed with a male screw thread 21 on the exterior of the fastener wall and fitted with a cylindrical plug 22 of smaller diameter than the screw thread 21, which plug 22 extends externally along the fastener axis from a driving end surface 24 of the threaded section of the fastener 14. Plug 22 is fitted with a concentric recess 25 in which two or more leaf members 26 are pivotably mounted by pins 28 with a coil spring 29 between the pivoted leaf members 26 and the plug 22 serving to bias the leaves outward from the axis of the plug 22. Pivot pins 28 are mounted to the forward wall 33 of recess 25 and the forward end 34 of each leaf member 26, taken in the direction the plug 22 is moved when it is inserted into a socket hole 40 as indicated by arrow 36. A flexible gasket 32 is fixed to the forward end 38 of plug 22. Alternately, hinge means other than pin 28 may join each leaf member 26 to plug 22, and spring 29 may be of a flat or bent shape.

FIGS. 2 and 4 illustrate the female fastener 15 formed with an external male thread 41 and shaped with a concentric socket hole 40 of a size to matingly engage plug 22 of the male fastener 14. Socket hole 40 extends from driving end surface 54 and is fitted with a concentric annular recess 43 of a size to engage leaf members 26 when they are spread apart by coil spring 31 of the male fastener 14, with recess 43 located at a distance from the bottom 44 of hole 40 so that plug flexible gasket 32 is snugly seated in the engaged position against the bottom 44 of hole 40. The wall 45 of recess 43, opposite the hole bottom 44, is shaped, in section, as a concave arc, the center of which is at the location of pivot pin 28 so that each leaf member 26 of the engaged male fastener 14 may rotate from the retracted to the extended position in contact with wall 45, as plug 22 engages hole 40 with the joint of the male 14 and the female 15 members, once engaged being permanent.

Alternately, as shown in dotted lines in FIG. 4, the wall 45A of recess 43, opposite from hole bottom 44, may be tapered or shaped in section as a convex arc, as seen from the pivot pin 28, so that in the engaged position of male 14 and female 15 members, a tension force applied to the engaged members 14 and 15 will separate the joint by wall 45A serving, under pressure of leaf member 26, to rotate each extended leaf member 26 from the extended position, as shown in FIG. 4, to the retracted position in the recess 25 of the plug member 22, thus permitting plug 22 to be removed from socket hole 40.

In order to individually rotate male fastener 14 and female fastener 15 into threaded holes in panels 12 and 13 respectively, slots 51 may be recessed below the driving surfaces 24 and 54 respectively to provide torque gripping means.

Although the external surfaces of preferred embodiment of the male and female fastener 14 and 15, as shown in FIGS. 2–4, are each formed as external male threads 21 and 41 respectively for individual attachment to panels 12 and 13 respectively, either or both fasteners may be formed with non-threaded external surfaces and of a shape to snugly fit under pressure in appropriate size holes in panels 12 and 13.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A pair of fasteners which may be joined together, with each of the pair of fasteners shaped to individually fasten to one of a pair of members that are to be joined together by the engaged pair of fasteners, in which said fasteners are each formed with an external screw thread, in which a first unit of the pair of fasteners is formed with a cylindrical axial socket hole and a second unit of the pair of fasteners is formed with a cylindrical plug that extends axially from said second unit, said plug of a size to fit into the socket hole of the said first unit, in which the socket hole of the first unit is formed with a concentric recess of a size to engage a pivoted leaf member fitted to the side of the plug, and in which the plug is fitted with a concentric recess of a size to retain a pivoted leaf member, said leaf member being pivotally mounted in said plug recess, said plug fitted with spring means to bias the leaf member to extend out of said plug recess and away from the axis of the plug, said recess of the socket hole of the first unit shaped, in axial cross-section of the first unit, with a convex curved recess wall extending from the wall of the axial socket hole, as viewed from the center of rotation of the pivoted leaf member of the second unit, in the assembled state of the fasteners, said convex curved recess wall located so as to bear against an end of the leaf member in the assembled state of the fasteners, so that an axial force applied between the two units, in the direction of separating the two units, biases the leaf member against the spring means and biases the leaf member away from the recess of the socket hole so as to permit disengagement of the two assembled units.

* * * * *